(12) United States Patent
Patz et al.

(10) Patent No.: US 7,865,131 B2
(45) Date of Patent: Jan. 4, 2011

(54) METHODS FOR IMPROVING CERTAINTY OF TEST-TAKER PERFORMANCE DETERMINATIONS FOR ASSESSMENTS WITH OPEN-ENDED ITEMS

(75) Inventors: Richard J. Patz, Aptos, CA (US); David Deas Sinkler Poor, Meadowbrook, PA (US)

(73) Assignee: The McGraw-Hill Companies, Inc., New York, NY (US)

( * ) Notice: Subject to any disclaimer, the term of this patent is extended or adjusted under 35 U.S.C. 154(b) by 1079 days.

(21) Appl. No.: 11/601,768

(22) Filed: Nov. 20, 2006

(65) Prior Publication Data

US 2007/0065798 A1 Mar. 22, 2007

Related U.S. Application Data

(63) Continuation of application No. 10/201,904, filed on Jul. 25, 2002, now Pat. No. 7,149,468.

(51) Int. Cl.
*G09B 11/00* (2006.01)
(52) U.S. Cl. ...................................... 434/353; 434/362
(58) Field of Classification Search ................. 434/322, 434/323, 350, 353
See application file for complete search history.

(56) References Cited

U.S. PATENT DOCUMENTS

| 5,466,159 | A | 11/1995 | Clark et al. |
| 5,672,060 | A | 9/1997 | Poor |
| 5,987,149 | A | 11/1999 | Poor |
| 6,120,299 | A | 9/2000 | Trenholm et al. |
| 6,256,399 | B1 | 7/2001 | Poor |
| 6,577,846 | B2 | 6/2003 | Poor |
| 7,127,208 | B2 | 10/2006 | Burstein et al. |
| 2003/0224340 | A1 | 12/2003 | Houseman et al. |
| 2004/0018480 | A1 | 1/2004 | Patz et al. |
| 2006/0265170 | A1 | 11/2006 | Gedlinske et al. |

OTHER PUBLICATIONS

Bennett, Dr. Randy Elliot, "The Role of Technology in Creating Assessment that Increases Participation in Post-Compulsory Education," Bridging the Gap—20th Annual IAEA Conference, Wellington, NZ, pp. 1-21 (Oct. 17-21, 1994).
Junker, Brian W., et al., The Hierarchical Rater Model for Rated Test Items, proceedings of the Psychometric Society, Champaign-Urbana, Illinois, pp. 1-25 (Jun. 17-21, 1998).
Patz, Richard J., "Markov Chain Monte Carlo Methods for Item Response Theory Models With Applications for NAEP," (unpublished Ph.D. dissertation, Carnegie Mellon University), cover sheet, pp. ii-x and 1-123 (Nov. 1996).
Patz, Richard J., et al, "The Hierarchical Rater Model for Rated Test Items and its Application to Large-Scale Educational Assessment Data," cover sheet and pp. 1-31 (Mar. 31, 1999).
Patz, Richard J., et al., "The Hierarchical Rater Model for Rated Test Items and its Application to Large-Scale Educational Assessment Data," pp. 1-40, abstract and cover sheet, Montreal Canada (Mar. 22, 2002).

*Primary Examiner*—Kathleen Mosser
(74) *Attorney, Agent, or Firm*—Rothwell, Figg, Ernst & Manbeck, PC

(57) ABSTRACT

The current invention is designed to improve the certainty of test-taker classifications in testing programs utilizing open-ended items. The current invention discloses methods to improve certainty in estimates of test-taker performance for all test-takers while using a minimum of scoring resources. The invention selectively allocates resources to scoring by ceasing to allocate scoring resources to test-takers whose performance has been determined with sufficient certainty, and by having an additional reader or readers score responses from test-takers whose scores are close to cutoff levels. The invention further increases precision of scores for test-takers near a cutoff by selectively allocating more reliable and accurate readers to score responses most likely to influence a test-taker's performance classification. Other scoring resources are also shown.

27 Claims, 3 Drawing Sheets

COLLECTION STAGE

Continue with Scoring Determination Stage

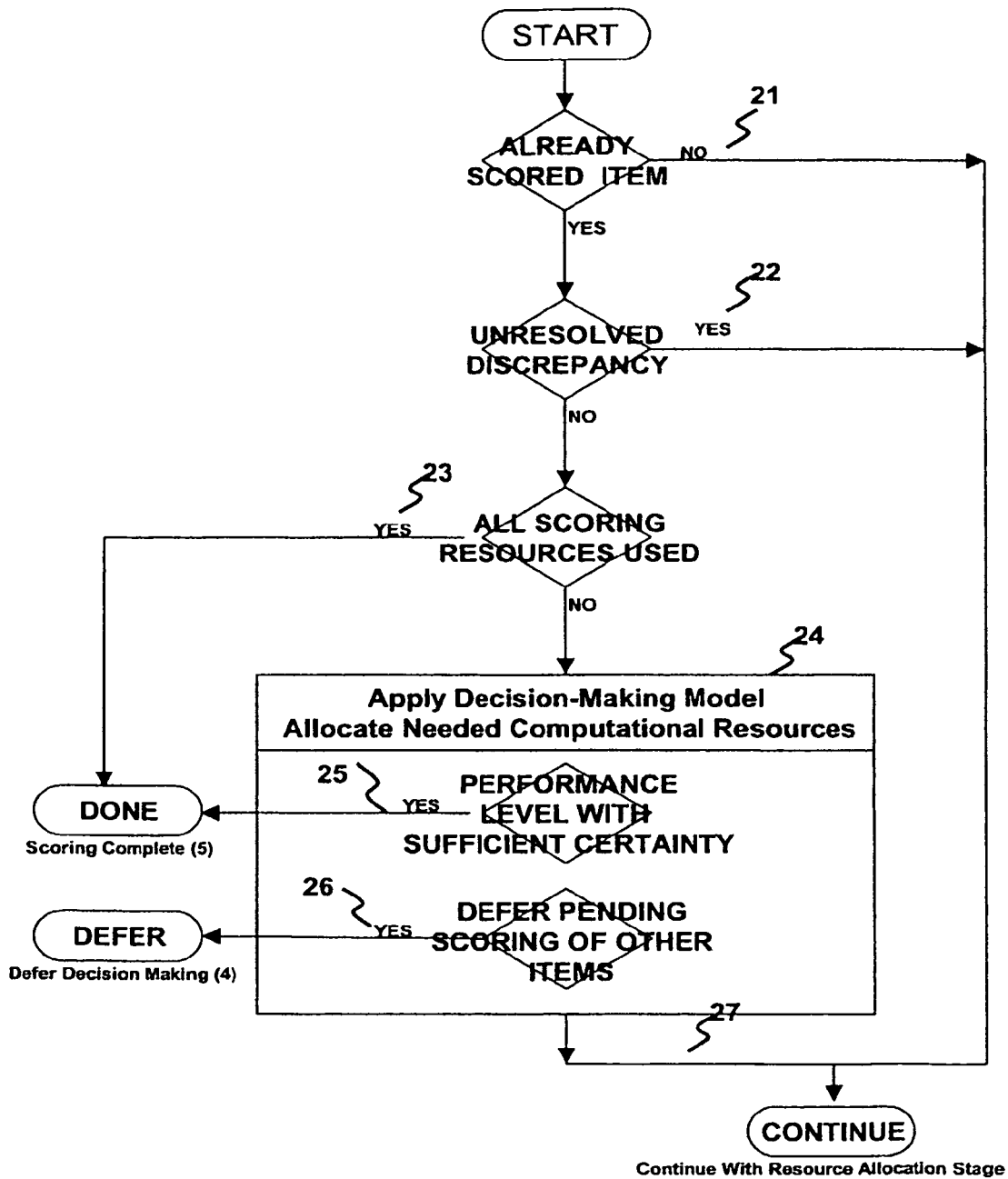

METHODS FOR IMPROVING CERTAINTY OF TEST-TAKER PERFORMANCE DETERMINATIONS FOR ASSESSMENTS WITH OPEN-ENDED ITEMS

BACKGROUND OF THE INVENTION

1. Field of the Invention

This invention is related to the general field of academic assessment testing, and within that field to the task of determining test-taker classifications relative to performance criteria in tests which contain at least one open-ended item. Although the methods described herein may be useful in other related tasks, the most common application involves tests for which performance standards are established and the most significant outcome of the test is the classification of test-takers into two or more performance levels.

2. Performance Standards

The current invention's primary application is to tests which are designed to measure whether or not test-takers have achieved specific performance standards.

Performance standards are used to determine whether or not the test-taker has demonstrated a required level of performance or achievement, or to classify the test-taker in terms of two or more "performance levels". For any given test, each performance level is represented as a range of scores on a test. The division between one performance level and an adjacent performance level is defined by a single score on the test, and such a score can be referred to as a performance cutoff score, or cutoff score. Test-takers who score at or above the cutoff score are deemed to have demonstrated the required level of achievement or proficiency represented by the standard for the upper performance level, while test-takers who score below the cutoff score are deemed to have not demonstrated the required level and are classified in the lower performance level. (In some instances the cutoff score is specified as the highest score below the standard rather than as the first score meeting or exceeding the standard.)

In K-12 tests, such standards are commonly used in "barrier" tests on which the student must meet the standard to continue on a normal academic path. In many state-wide tests, failure to meet the standard results in significant consequences including (a) being denied graduation, (b) being allowed to graduate but without a full diploma, (c) not being allowed to go on to the next grade, and (d) having to go to summer school in order to be promoted to the next grade.

In typical professional examinations, the applicant must meet the standard in order to achieve certification and therefore must reach or exceed the cutoff score in order to become certified or approved.

For some tests, multiple performance levels are established with cutoff scores separating each successive level.

Open-Ended Items

The current invention is further focused on tests that contain one or more open-ended items which are included in determining the test-taker's score relative to the cutoff score. Such tests may or may not include multiple-choice and other objective assessment items in addition to open-ended items. Such multiple-choice and other objective assessment items have proven to be cost effective, and there are common practices in the educational assessment industry to ensure accurate scoring for such multiple-choice items. In addition, to further enhance the precision of scores of multiple choice items in situations where a precise score is critical to the certainty of the performance level determination, it has been proposed in the administration of state-wide tests to automatically re-score the test of any student whose first score is within a specified range below a cutoff score.

For a number of reasons, over the past decade, open-ended items have been increasingly adopted, especially in state-wide tests, and such items are not scored with the precision of scoring multiple-choice and other objective assessment items.

Typically such open-ended items are scored by human "readers"; that is, each response is read by one or more trained readers who assign appropriate scores to the response.

Reliability of Reader Scores

It is necessary to train readers so that all readers will give equivalent scores to assessment responses, and there are well established procedures in the industry to provide such training and to test readers for accuracy before they are allowed to read and score test-taker responses. Nonetheless, readers do not give identical scores to test-taker responses. While a few readers will be close to accurate most the time, many readers will show patterns of inaccuracies. Such patterns include being overly harsh, overly lenient, and being inconsistent. In some instances, readers can be characterized by the patterns of their inconsistencies. In all instances, readers can be characterized in terms of their accuracy in assigning scores to open-ended items.

Reader accuracy can be modeled using what is known as the Hierarchical Rater Model, "HRM" (Richard J. Patz, Markov Chain Monte Carlo Methods For Item Response Theory Models With Applications For NAEP, (1996)(unpublished Ph.D. dissertation, Carnegie Mellon University); Brian W. Junker and Richard J. Patz, The Hierarchical Rater Model For Rated Test Items, proceedings of the Psychometric Society, Champaign-Urbana, Ill., USA, June, 1998; Richard J. Patz, et al, The Hierarchical Rater Model for Rated Test Items and its Application to Large-Scale Educational Assessment Data, March 1999; Richard J. Patz, et al., The Hierarchical Rater Model for Rated Test Items and its Application to Large-Scale Educational Assessment Data, March 2002), although other models of rater accuracy and other procedures can be employed. Reader (or rater) accuracy is typically estimated by data from one or more of three common processes: monitoring items, lead reader review, and inter-reader agreement.

Monitoring items: Monitoring items are test-taker responses for which the correct scores have been determined and vetted by senior project personnel. Such items can also be called "validity items" or "check set" items. As part of the scoring process, such monitoring items are intermixed with unscored test-taker responses for assignment of scores by the reader. The extent to which a reader's scores match the correct scores indicates the accuracy of the reader.

Lead reader review: In lead reader review, the scores assigned by the reader are checked by a skilled "lead" reader. In this procedure, the lead reader scores a subset of the items scored by the reader and checks the score assigned by the reader for accuracy. The extent to which the lead reader identifies the reader scores as accurate indicates the accuracy of the reader.

Inter-reader agreement: In scoring some items such as essays and other items requiring extended responses, each test-taker response is often scored independently by two different readers. While standard practices use two independent readers, any number of readers can independently score an item. The extent to which readers' scores match is an indication of inter-reader agreement and is a measure of consistency in scoring across readers. For each reader, the extent to which his or her scores match those of other readers can be considered a measure of the reader's accuracy, or at least a measure of the reader's agreement with other readers in the project.

Determining the "Correct Score" for Open-Ended Items

Because readers are not 100% accurate, the score given by a reader can not be assumed to be the correct score, but only a single estimate or measurement of the test-taker's score on the assessment item.

By using measures to determine reader accuracy, such as those listed above, the extent to which test-taker scores may be inaccurate can be estimated. However, measures of reader accuracy do not directly offer any opportunity to correct errors in scores, but merely describe the extent to which reader assigned scores may be considered fair representations of the "correct scores" for the assessment items.

Improving the Precision of Test-Taker Scores While Determining Reader Aaccuracy:

Although the determination of reader accuracy does not directly offer a mechanism to adjust or correct test-taker scores, the processes shown above to determine reader accuracy, offer opportunities to increase the accuracy of scores given to test-takers.

Monitoring items: If a reader is deemed to be incorrectly scoring items, scores from the reader may be removed from a set of items and those items can be scored by another reader as if the items had never been read. In such instances, the test-takers whose items are read by another reader may or may not end up with scores that are more accurate than the scores originally given. In general, however, monitoring items are used to measure reader accuracy and do not cause test-taker scores to be altered.

Lead reader review: As with monitoring items, lead reader review is primarily directed to measure reader accuracy and not alter reader scores. However, it is possible to override the score assigned by a reader with the score assigned by the lead reader or with a score that is a fiction of both the reader and the lead reader. While such a procedure would seem to improve the accuracy of test-taker scores, it suffers from two systemic problems. First, even if a lead reader scores are substituted for a reader score, the resulting test-taker score is still based on a single reader's judgement. Secondly, only a small percentage of test-taker scores are read by lead readers, usually around 10 percent, so that approximately 90% of the test-takers have no opportunity to receive a more reliable score than that originally given.

Inter-reader agreement: Unlike the above two procedures, having two independent readers read the same item is designed primarily to increase the accuracy of test-taker scores. In statistics, it has long been known that measurement accuracy will increase with more independent measures of the same thing. Thus, scores based on the average (or sum) of two independent readers will be more accurate than one reader, and precision will increase as the number of independent reads of a given item increases.

In addition, in general industry practice, the use of two readers is further refined to provide "resolution", or correction, when the two readers disagree. In standard practice, pairs of scores from two independent readers are characterized as "discrepant" or "not discrepant". In all cases, exactly the same scores from two independent readers are "not discrepant". Depending on the item being scored, adjacent scores may be characterized as either discrepant or not discrepant. In almost all cases, scores with an absolute difference more than one are considered discrepant. If scores from two readers are "discrepant", a third read is performed, often from a highly knowledgeable and reliable reader or administrator. While the manner in which this third score is utilized varies, the test-taker is increasingly likely to have a "correct" score when two readers agree or when a third reader has adjudicated the disagreement between the two readers; at least relative to having only a single reader score the item.

Accordingly presently employed assessment scoring schemes do not incorporate a determination of the likely result of the allocation of scoring resources, and thus, limited scoring resources are often used inefficiently. Scoring resources are often used in situations in which the likely outcome of the allocation of scoring resources is that the test-taker's performance level will not change. Conversely, situations may arise in which scoring resources are not allocated in a circumstance in which there is a significant likelihood that the outcome of the allocation of scoring resources would have changed the test-taker's performance level. Thus, under presently used assessment scoring schemes, scoring resources are overused in some circumstances and underused in other circumstances.

SUMMARY OF THE INVENTION

The current invention provides a mechanism to improve the certainty in the determination of test-taker performance levels by the selective allocation of scoring resources to scoring test-taker responses to open-ended items. In the context of the present invention, the certainty in the determination of the test taker performance refers to the likelihood that allocation of scoring resources (initial scoring resources or additional scoring resources) will change an estimate of the test-taker's performance level. The selective allocation involves the identification of specific test-taker and then to the selection of specific responses to open-ended items by those test-takers. While all test-taker responses to open-ended items are scored, and all scoring utilizes resources, only selected test-taker responses are allocated to scoring procedures which utilize additional resources. The selection process is designed to allocate such additional resources to scoring test-taker responses to items, the scores to which, if determined with increased accuracy, will increase the accuracy of selecting the performance level for the test-taker.

While this description of the invention is stated in terms of the selection of responses that receive additional resources based on categorizing responses, it applies equally to allocation of resources based on a continuum rather than based on a categorization.

Example using Two Independent Readers:

In general, having two independent readers for each test-taker response is generally accepted as a way to get more accurate scores for open-ended items in the context of high stakes testing programs. Although having two independent readers is a time-consuming and costly enterprise, it has in the past generally been applied to all test-takers, whether or not the additional cost is justified for any given test-taker. The current invention can be used to differentiate between those test-takers whose open-ended items are scored only once and those whose open-ended items are scored by two independent readers with resolution. In this scenario, the use of a second reader and the resolution of discrepant first and second scores represent the allocation of additional resources relative to a single reader scoring the item.

An initial example application utilizes tests with multiple-choice items and at least one open-ended item and the allocation of second reads as additional resources. Once the multiple-choice items have been scored and a first reader has assigned a score to each open-ended item, then additional resources can be allocated only to test-taker items which, if adjusted, could change the test-taker's performance level. If, for instance, a test-taker receives a perfect score on the multiple-choice items within a test, that test-taker may well achieve the highest performance level regardless of the scores on open-ended items. Likewise, a test-taker with an extremely low score may well be in the lowest performance level regardless of the scores on open-ended items. In such cases, test-takers whose multiple-choice scores are sufficient to determine the performance level will not receive any additional scores, while other test-takers will have their open-ended items scored by a second reader with resolution of discrepancies between first and second readers.

A more refined implementation of the invention for the above example allocates additional resources to the scoring of open-ended items only to test-taker items which, if adjusted, could reasonably be expected to change the test-taker's performance level. With this refinement, there are several methods that can be used to determine which test-taker items should be scored twice.

One method is to first determine, for each open-ended item, the possible scores that could result following a second reading (with resolution), and estimate the probability of each score. Such probability estimates can be built using statistical models which may include estimates of reader agreement, the distribution of scores on the open-ended items, the likelihood of specific open-ended item scores in the context of the multiple choice scores, and other observed or estimated parameters.

With such estimates, the probability of each possible total score can be established and thereby the probability of each possible performance level for the test-taker. Based on a selected level of certainty, then, those test-takers whose performance level is unlikely to change will be considered scored at an acceptable level of certainty, and, for all remaining test-takers, some or all of their open-ended items will be scored by a second reader. For example, if the chances are 99.5% that the performance level will not be altered by a second read of open-ended items, then that test-taker's open-ended items would not be re-read. On the other hand, if the chances are 50% that the performance level will be altered following a second read of open-ended items, that test-taker's open-ended items would certainly be re-read by a second reader.

An appropriate level of certainty may well vary from project to project. For very high stakes tests, the level of certainty may be as high as 90% or 95% confidence that the score will not change if an item is scored by a second reader.

Another method to determine which test-takers' open-ended items should be selected is based on the common statistical concept of "standard error" or "error of measurement". Using an estimate of error, the invention is practiced by a series of steps for each test-taker. First, the multiple-choice scores and the first reader's scores on each open-ended item are recorded. Then the test-taker's total score is calculated along with the estimate of the error. The test-taker's performance level is determined by the observed total score. In statistical terms, however, the observed total score is considered an estimate of the test-taker's performance on the test and the estimate of error is then used to determine range of likely "true" total scores for the test-taker. In tests with open-ended items, the estimate of error will depend, in part, on the precision and accuracy of the scores given to the open-ended items and therefore the estimate of error can be reduced by increasing the precision of the open-ended items, i.e., having the items read by a second reader.

If there is a cutoff score "near" the test-taker's observed total score, then additional resources will be allocated to the open-ended items, where the "nearness" is a function of the estimate of error and the difference between the test-taker total score and the cutoff. Thus only open-ended responses from test-takers with observed scores close to the cutoff will be read a second time.

Scoring Resources:

Although the concepts of this invention can equally well be applied to other scoring resources, the preferred implementation includes allocation of additional resources in terms of (a) allocation of additional readers, (b) allocation of readers according to reader accuracy, (c) allocation of extended computational resources.

Allocation of additional readers: As shown above, the unselective use of two independent readers is common for many tests. The example above describes the use of the invention with the allocation of a second independent reader and resolution of discrepancies with tests using multiple-choice and open-ended items. In general, the more independent readers that read an item, the more accurate the resulting score will be (Patz et al, 2001). Additional readers can be allocated including second readers, third readers, and more.

Allocation of readers according to reader accuracy: As shown above, readers can be characterized in terms of their pattern of responses and in terms of their overall accuracy, and such project related characteristics can be discrete categories or continua. In general, a more accurate reader is a more valuable resource and will provide more accurate scores to test-takers than a less accurate reader. In one aspect of this invention, accurate readers can be assigned to score selected items in order to increase the accuracy of scoring those particular items relative to having readers randomly assigned to score items.

This process is a novel combination of existing methodologies to measure reader accuracy and the concept of pairing readers and test-takers first shown by Clark et. al.(U.S. Pat. No. 5,466,159), the disclosure of which is hereby incorporated by reference. In terms of Clark, the calculation of reader reliability is one component of a "quality profile" for the reader. However, Clark does not recognize that reader reliability can be advantageously used to match readers to specific items that need to be scored and only suggests selective allocation of items to readers based on matching readers and test-takers by demographic characteristics such as "race, gender, or geographic location". In the current invention, project based characteristics of test-takers are incorporated in assigning scoring resources to test-taker responses.

Since reader scores are merely estimates of the "correct score" on each item, the use of the best readers to score selected items may provide significantly more precise estimates than items randomly assigned to readers. Moreover, at least for the first reading for any open-ended response, the incremental cost for allocating items to a subset of the readers is far less than the cost of having items read multiple times.

Within a project, specific characteristics of readers can be considered with the resource value increasing from regular readers, to highly accurate regular readers, to lead readers, and finally to highly skilled project managers.

Allocation of extended computational resources: In the example above, the first method to select items based on expected probability distributions of scores is a computationally complex process since it needs to be done for each test-taker. In this and other sophisticated statistical models, computational resources can become an issue when thousands of test-takers are being processed in a short period of time, especially if such extensive computational procedures are carried out separately on each test-taker. The selective allocation of additional computational resources is therefore one of the additional resources included. In the preferred embodiment of the invention, more extensive computations for selection of items to be allocated additional scoring resources are themselves scoring resources and only applied to test-takers whose determination of performance levels falls short of an established requirement.

Allocation of Items to Ensure Distribution of Items to Readers:

A consequence of allocating readers to selected items is that some readers may be given many instances of similar items. In general, readers need to read and score a representative sample of strong, average, and weak responses to items. If a reader sees nothing but high papers, nothing but low papers, or nothing but middle papers, the reader is likely to start "second guessing" the scores in order to utilize the full range of available scores. It is therefore important to ensure that readers get a representative sampling of items throughout the full score range. In the preferred embodiment of the invention, therefore, readers are further characterized by the distribution of items that have been allocated to and scored by each reader. The decision process for the allocation of items then takes into account such characteristic to ensure that the set of responses allocated to each reader is representative of the total set of responses to be scored.

As with allocating readers by reader accuracy, consideration of the distribution of items to readers utilizes reader characteristics in the decision process of allocating readers to items. Unlike the reader characteristics recognized by Clark, however, the distribution of items to a reader depends entirely on the project and changes over time and are therefore project based characteristics.

Allocation of Items for Lead Reader Review:

Standard industry procedures include lead reader review of a sampling of first reads from each reader. In terms of the invention, the extent to which a reader's scores have been reviewed by a lead reader is another project based reader characteristic that changes over time. When items from a reader need to be sent to a lead reader for review, specific items can be selected for lead review based, in part, on identifying those items which are most likely to increase the overall precision of test-taker scores to yield the required level of certainty in test taker performance classifications. In the preferred embodiment of the invention, therefore, the decision process for the allocation of items takes into account the need for lead reader review of each reader's scores based on a characteristic of the reader which is a function of the number of responses scored by the reader and the number of such responses allocated to a lead reader for review.

These and other aspects of the invention will be apparent in the context of the following description as well as the drawings and claims.

BRIEF DESCRIPTION OF THE DRAWINGS

FIG. 3 is a flow chart which shows the decision processes and outcomes for each item from the Scoring Determination Stage.

DETAILED DESCRIPTION OF PREFERRED EMBODIMENTS OF THE INVENTION

Prior to scoring, a set of open-ended item responses associated with a number of test-takers are collected for scoring, typically by administering an assessment (i.e., a test) to the test-takers. In the preferred embodiment of the invention, the test-taker open-ended item responses are stored in a digitized form suitable for scoring by presentation by a computer such as shown in U.S. Pat. Nos. 5,672,060, 5,987,149 and 6,256,399 (Poor) the disclosures of which are hereby incorporated by reference. The stored test-taker responses are then added to a database or other appropriate repository of items ready for scoring as represented at step (7) in FIG. 1.

Figure 1:
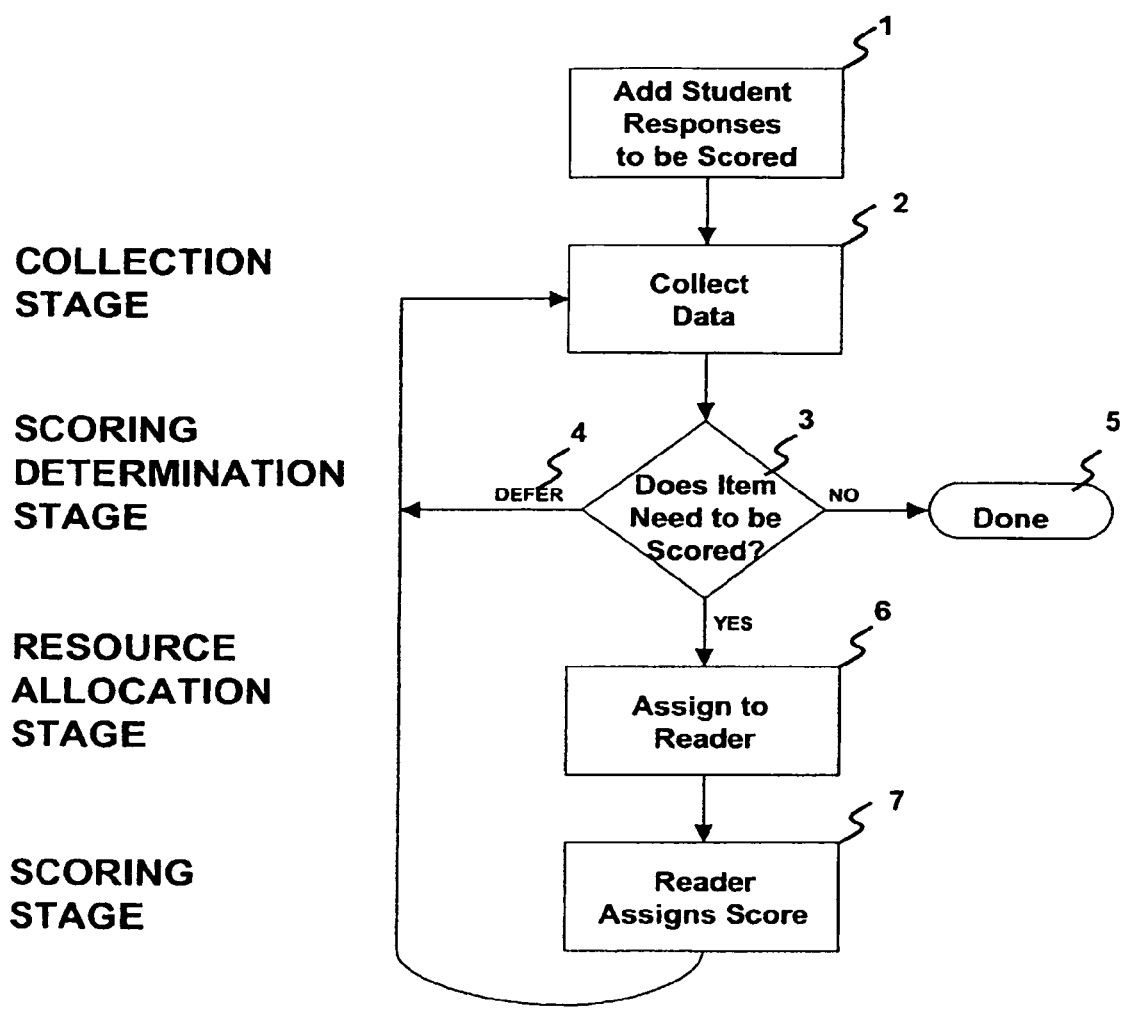
FIG. 1 is a flow chart which shows the stages in scoring open-ended assessments with selection of items to be scored and allocation of scoring resources based on information on the test-taker and test-taker performance on the assessment items.

As shown in FIG. 1, the scoring then progresses through a series of stages providing successively more precise scores for open-ended items until the test taker's performance level classification is determined at a specified level of certainty, or until some other stopping criteria is reached. These stages are:

Collection stage in which test-taker responses and scores and other data are collected.

Scoring determination stage where at step (3), it is determined whether an open-ended item response needs to be scored, can be deferred until the next iteration (4), or has its final score (5), Resource allocation stage (6) in which scoring resources are allocated to the item based on test-taker scores and other data from the collection stage, and Scoring stage (7) in which a reader assigns a score to the item. This score then gets added to the data collected in step (2) and the stages are repeated until a final score is determined at step (5).

Collection stage: The collection stage (2) is a deviation from the sequence of processing shown in U.S. Pat. No. 5,672,060 (Poor), and industry standard practices because scores are calculated and utilized as early in the process as possible. In the prior art, scoring is deferred until the final scores for all open-ended item responses are completed while the current invention is best practiced with scoring or estimates of scores calculated on each iteration.

The collection stage is used to gather information needed to apply the calculations necessary for the next two stages, although the invention can be practiced with other sequences including when data are collected and stored. Depending on the model to determine whether an items needs to be scored and the model to determine which additional resources, if any, are allocated to scoring an item from the test-taker, different data will need to be collected.

Figure 2:
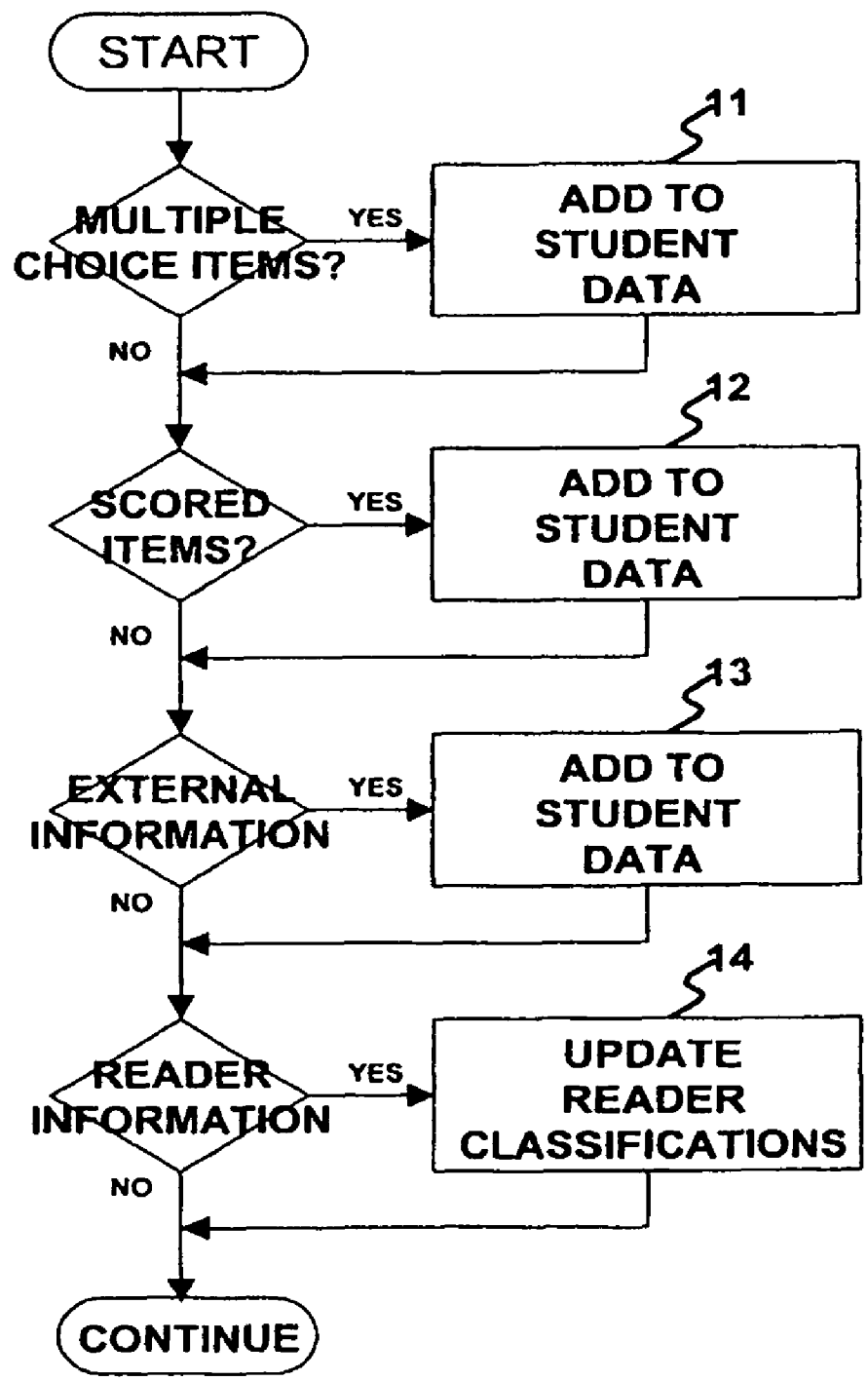
FIG. 2 is a flow chart which shows collection of the data used for decision making in the context of the flow chart of FIG. 1.

In the preferred embodiment of the collection stage (shown in FIG. 2), data on the test-taker includes scored multiple-choice item responses, scored open-ended item responses, and, in some instances, external information about the test-taker. In determining the precision of the estimates of the total scores, project based reader characteristics may also be used, and project based reader characteristics may also be part of the determination of which item responses need to be scored. Such project characteristics include, but are not limited to, the reader's reliability or accuracy, the distribution of item responses that the reader has been asked to score, and the extent to which an appropriate number of the reader's scores have been reviewed by a lead reader.

If there are multiple-choice items in the test, the test-taker's score on the multiple-choice item responses is determined and collected, as represented at step (11). In the preferred embodiment of the invention, the multiple-choice items are scored before the process begins and are stored at the same time the open-ended item responses are added for scoring as required in step (1) of FIG. 1.

If any of the open-ended item responses have been scored, the scores should be included in the data collected for decision-making as represented at step (12). While such scores will generally come from within the scoring system from the scoring stage and automatically be added as scores are assigned by readers (7), some scores may come from external sources such as teachers.

Because resources in the "resource allocation stage" can be partially determined by the test-taker's expected score, outside indicators, such as scores on prior tests or other teacher ratings can be used to establish or refine the expected score and therefore contribute to the decision making. Such external information therefore needs to be added to the test-taker data as represented at step (13).

Because estimates of the error of measurement can be partially based on reader accuracy and because reader characteristics may influence the selection of items to be scored, reader characteristics need to be maintained and current. If there are new data for the reader, the information needs to be added to the reader data as represented at step (14).

Once the data have been collected, the decision making for the next two stages (scoring determination and resource allocation) can take place. In the preferred embodiment of the invention, computational procedures based on the FRM model are integrated into the decision process although other models such as described in the example above can alternatively be used. For convenience of presentation, the scoring determination and resource allocation stages are shown as discrete, sequential processes although they can be implemented as a single process.

Scoring Determination Stare: This stage is used primarily to determine whether an item response needs to be read. In almost all projects, items start as unread (i.e., no scores) and all items need to be scored at least once. Although there might be exceptions to this initial reading of all items, such exceptions are rare. Such exceptions might include cases where an external (teacher) score was already available or in which test results could be reported without scoring all the open-ended items. Therefore, as represented at step (21) in FIG. 3, the initial decision point is typically that an item response needs to be scored if it has not previously been scored.

If there are two or more scores for an open-ended item response, and there are discrepant but unresolved scores, normal industry standards mandate that a third, resolution read be added as represented at (22).

If there is a score for the item, and all available scoring resources have already been applied, the score is treated as final and a stopping criteria is reached (23). The final scoring resource for any item might be personal review by the project's most experienced and senior content administrator with possible consultation with the client. Once such review is completed, there is generally nothing further that can be done for the item.

Otherwise, if there is a score for the item response, the decision-making model (24) must be employed to determine whether or not the item response needs to be scored again. Within the decision making process itself, additional computational resources may be applied for selected test-taker responses.

If the test-taker's performance level is determined with sufficient certainty as represented at (25), a stopping condition (5) has been reached, and the item response does not need to be scored again. For some items, the determination of additional scoring can best be delayed (26, 4) when there are other items that, if given additional scoring resources, might bring the determination of the test-taker's performance level to a sufficient certainty. If the score is not determined to be final and the determination of whether or not to allocate additional scoring resources is not deferred, the item needs to have additional scoring resources assigned to it as represented at (27).

In the preferred embodiment, a two-step decision model is used to speed up the decision process and conserve computational resources. Initially, a conservative range around each cutoff score is established. If a test-taker's score is not within the specified range around one or more cutoff scores, there is a stopping condition for the test-taker and sufficient certainty has been reached. Otherwise, for each of the test-taker's open-ended items, a more sophisticated analysis is performed.

Thus, additional computational resources are assigned only for those test-takers whose scores fall within the conservatively large range of scores that might be altered by the allocation of additional scoring resources to constituent items. In the preferred embodiment, the more sophisticated analysis utilizes the HRM model which provides estimates for the test-taker score on the item as well as estimates of reader accuracy. In the preferred embodiment, all available information is used to estimate both the test-taker's score on the test and the standard error of measurement for the score, including estimates for reader accuracy from the HRM model.

The outcome from this more sophisticated analysis is to specify whether an item response needs to be scored again and the characteristics of the reader to do the scoring: regular reader, highly accurate reader, lead reader, or project level reader. This process may determine that no items need additional reading, a stopping condition (25), that there are no more resources that can be applied to some items (23), that all constituent items need additional reads (27), or that some items need additional reading (27) and other items can be reexamined after the additional reading of the items identified to need additional reads (26).

Resource allocation stage: Once an item is deemed to need an additional scoring by a reader, the allocation of appropriate scoring resources is required. As noted above, in the preferred embodiment of the invention, the determination of appropriate resources is done concurrently with the determination of whether an item needs an additional scoring. In concept, however, this stage can follow the determination that an item needs additional scoring. The primary function of this stage is to determine the required characteristics of the reader who will score the item in terms of normal readers, highly accurate readers, lead readers, or highly skilled project personnel. As shown above, this stage can also take into account reader characteristics such as ensuring that a reader is given a representative set of items to score and ensuring that an appropriate number of reader scores are allocated for review by a lead reader.

This allocation stage enables significant enhancements on normal industry procedures in several areas including reading items for the first time, lead reader review, and third or resolution reads.

Reading item responses for the first time: When an item response is being scored for the first time, normal industry practices will randomly assign the item to a reader. If, however, an analysis of available data can estimate whether a test-taker is likely to have a total score near a cutoff score, the allocation of readers to items, even on the initial read, can be done selectively so that more accurate readers receive items from test-takers who are likely to be near a cutoff score. With the increase in accuracy from such readers, it may be possible to get estimates of the test-taker total score with sufficient precision yielding test taker classifications with sufficient certainty to obviate the need for additional reads.

Lead reader review: As shown above, the need for lead review is, in effect a reader characteristic that becomes part of the decision making process so that items assigned for lead review can serve to enhance the certainty of the test-taker performance as well as serving the normal review of reader accuracy.

Third or resolution reads: By utilizing the invention, it is possible to allocate less intensive resources to some resolution scoring than might otherwise be expected. For example, in some instances where there are two discrepant reads and a resolution read is required, it is possible to let any reader serve as the resolver because either score would result in the same test-taker performance level. Alternatively, it may be possible to assign the highest level of senior project personnel to provide third reading in a case such that, with any likely result from the third reading, the test-taker's total score would be close to the cutoff so that the highest level review would eventually be required regardless of the outcome of the third reader resolution.

I claim:

1. A method of allocating resources in conjunction with scoring a test-taker's response to an open-ended item of an assessment including a plurality of items that contribute to a specific performance level classification, wherein the method is implemented using a computer system programmed to perform steps comprising:
   a. collecting test-taker information and adding the collected information to a database of the computer system;
   b. estimating a test-taker performance classification for a portion of the assessment comprising the plurality of items based on the collected test-taker information, wherein estimating the performance classification comprises classifying the test-taker into one of two or more performance levels;
   c. estimating the certainty of the estimated test-taker performance classification; and
   d. allocating a scoring resource to score the test-taker's response to the open-ended item as a function of the estimated certainty that the test-taker falls within one performance level and not a different performance level.

2. The method of claim 1, wherein the test-taker information includes at least one score on at least one multiple choice item of the plurality of items.

3. The method of claim 1, wherein the test-taker information includes at least one score on at least one additional open-ended item of the plurality of items.

4. The method of claim 1, wherein the test-taker information includes at least one score on the open ended item.

5. The method of claim 1, wherein the test-taker information includes at least one score from at least one other assessment.

6. The method of claim 1, wherein the test-taker information includes at least one teacher rating.

7. The method of claim 1, wherein the estimated performance classification corresponds to an estimated score on the plurality of items.

8. The method of claim 1, wherein the estimated performance classification corresponds to an estimated performance level on the plurality of items.

9. The method of claim 1, wherein the estimated performance classification corresponds to an estimated score on the open-ended item.

10. The method of claim 9, further comprising:
    a. determining reader accuracy based on estimated test taker performance and a score assigned by a reader; and
    b. allocating scoring resources based on that determination.

11. The method of claim 1, further comprising assigning a first score to the open ended item.

12. The method of claim 11, further comprising assigning, by the scoring resource, an additional score to the open ended item.

13. The method of claim 1, further comprising determining that a stopping criteria has been reached.

14. The method of claim 13, wherein the stopping criteria corresponds to applying all available scoring resources.

15. The method of claim 13, wherein the stopping criteria corresponds to applying all allocated scoring resources.

16. The method of claim 13, wherein the stopping criteria corresponds to a lack of additional scoring resources that would substantially improve a certainty of the estimated test-taker performance classification.

17. The method of claim 13, wherein the stopping criteria corresponds to a determination that the estimated test-taker performance classification is determined with sufficient certainty.

18. The method of claim 1, wherein the estimate of the precision corresponds to reader characteristics of at least one of an individual reader and a set of readers.

19. The method of claim 18, wherein the reader characteristics include reader accuracy.

20. The method of claim 18, wherein the reader characteristics include a distribution of item scores assigned by a reader.

21. The method of claim 18, wherein the reader characteristics include reader agreement statistics.

22. The method of claim 1, wherein step d. is initially performed before two readers have scored the test-taker's response to the open-ended item.

23. The method of claim 1, wherein step d. is initially performed after only a single reader has scored the test-taker's response to the open-ended question.

24. The method of claim 23, wherein no further scoring resources are allocated to score the test-taker's response to the open-ended question if the test-taker's performance classification is determined to be estimated with sufficient certainty after only the single reader has scored the test-taker's response to the open-ended question.

25. A method of allocating scoring resources in conjunction with scoring a test-taker's response to an open-ended item of an assessment, wherein the method is implemented using a computer system programmed to perform steps comprising:
   (a) collecting test-taker information and adding the collected information to a database of the computer system;
   (b) assigning the open-ended item of the assessment to only a first reader to assign a score to the open-ended item of assessment;
   (c) storing the score assigned by the first reader to the database as part of the collected information;
   (d) estimating a performance classification for the test-taker using collected information including the score of the open-ended item of the assessment assigned by the first reader;
   (e) estimating the certainty of the estimated performance classification; and (f) only if it is determined that the test-taker's estimated performance classification has not been estimated with sufficient certainty, assigning the open-ended question to a second reader.

26. A method of allocating scoring resources in conjunction with determining a test-taker's performance level classification, wherein the method is implemented using a computer system programmed to perform steps comprising:
- (a) collecting test-taker information including responses to each of a plurality of open-ended items of the assessment that contribute to a specific performance level classification and adding the collected information to a database of the computer system;
- (b) selecting an un-scored open-ended item response of the plurality of open-ended item responses;
- (c) assigning the selected open-ended item response to a reader to assign a score to the selected open-ended item response;
- (d) storing the reader's score of the selected open-ended item response in the database as part of the collected information;
- (e) repeating steps (b) through (d) for each un-scored open-ended item response of the plurality of open-ended item responses;
- (f) estimating the test-taker's performance level classification based on the collected test-taker information, wherein the estimating the test-taker's performance level classification comprises classifying the test-taker into one of two or more performance levels;
- (g) estimating the certainty of the estimated test-taker performance level classification; and
- (h) if the test-taker's performance level classification has been estimated to fall within one performance level and not a different performance level with sufficient certainty, stopping the scoring of the plurality of open-ended item responses; and
- (i) if the test-taker's performance level classification has been estimated to fall within one performance level and not a different performance level with insufficient certainty:
  - (1) choosing a response from the plurality of open-ended item responses;
  - (2) assigning the chosen open-ended item response to a reader that has not already scored the chosen open-ended item response to assign an additional score to the item;
  - (3) storing the additional score of the chosen open-ended item response in the database as part of the collected information; and
  - (4) repeating steps (f) through (i).

27. The method of claim 26, wherein the choosing step of step (i)(1) comprises choosing one or more item responses deemed likely to achieve sufficient certainty in the estimation of the test-taker's performance level classification, thereby deferring the allocation of additional scoring resources from other item responses.

* * * * *